(12) United States Patent
Camble et al.

(10) Patent No.: US 6,839,824 B2
(45) Date of Patent: Jan. 4, 2005

(54) SYSTEM AND METHOD FOR PARTITIONING A STORAGE AREA NETWORK ASSOCIATED DATA LIBRARY EMPLOYING ELEMENT ADDRESSES

(75) Inventors: Peter Thomas Camble, Bristol (GB); Stephen Gold, Bristol (GB); Curtis C. Ballard, Eaton, CO (US); Stan S. Feather, Longmont, CO (US); Jeffrey Dicorpo, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 332 days.

(21) Appl. No.: 10/033,009

(22) Filed: Dec. 28, 2001

(65) Prior Publication Data

US 2003/0126395 A1 Jul. 3, 2003

(51) Int. Cl.[7] .......................... G06F 13/00; G06F 12/00; G06F 9/00
(52) U.S. Cl. ......................... 711/173; 711/111; 711/154
(58) Field of Search .............................. 711/100, 112, 711/114, 173, 111, 154; 709/321, 328, 203; 369/47.1, 30.06, 30.28, 178.01; 360/98.01

(56) References Cited

U.S. PATENT DOCUMENTS

| | | | |
|---|---|---|---|
| 5,164,909 A | | 11/1992 | Leonhardt et al. |
| 5,367,669 A | * | 11/1994 | Holland et al. ................ 714/7 |
| 5,416,914 A | | 5/1995 | Korngiebel et al. |
| 5,734,859 A | | 3/1998 | Yorimitsu et al. |
| 5,805,864 A | | 9/1998 | Carlson et al. |
| 5,835,940 A | * | 11/1998 | Yorimitsu et al. .......... 711/112 |
| 5,867,736 A | | 2/1999 | Jantz |
| 5,890,014 A | | 3/1999 | Long |
| 5,970,030 A | | 10/1999 | Dimitri et al. |
| 6,038,490 A | | 3/2000 | Dimitri et al. |
| 6,044,442 A | | 3/2000 | Jesionowski |

(List continued on next page.)

FOREIGN PATENT DOCUMENTS

| | | |
|---|---|---|
| EP | 09185465 | 7/1997 |
| EP | 0859308 | 8/1998 |
| EP | 10269026 | 10/1998 |
| EP | 2001014257 | 1/2001 |
| EP | 1156408 | 11/2001 |

OTHER PUBLICATIONS

Foreign Search Report dated Feb. 13, 2003.
IBM Technical Disclosure Bulletin, "Optical Disk Drive Loader for Work Station with Pluggable Magazine", vol. 38, No. 12, Dec. 1955, pp. 243–246.
IBM Technical Disclosure Bulletin, "Logical Grouping of Data Storage Media in a Library System", vol. 35, No. 5, Oct. 1992–pp. 17–20.
Massiglia, P., "The Raid Book", 6th edition, Feb. 1997, 83 pages.
"Sharing Backup Resources," Ralph Cuellar; Apr. 2000.
"The Gator Tape Library Family Architecture," John Kranz; Oct. 1999.
"Fibre Channel Fundamentals," Tom Weimer.
"Spectra 12000 User Guide," Sep. 2000.

Primary Examiner—Tuan V. Thai

(57) ABSTRACT

A data library comprising a plurality of partitions, at least one data transfer element, each of the data transfer elements assigned to one of the partitions and assigned an internally unique element address, a plurality of data storage element slots, each of the slots assigned to a partition and assigned an internally unique element address, at least one media transport element shared by the partitions to move media between the slots and the at least one data transfer elements, the transport assigned an internally unique element address, and a library controller that assigns a different logical unit designation to each of the partitions and that assigns external element addresses to the transport, the data transfer elements, and the slots for each of the partitions and maps the internally unique addresses to the external addresses, the controller restricting movement of media to and from the slots assigned to a same of the partitions.

24 Claims, 4 Drawing Sheets

U.S. PATENT DOCUMENTS

| | | |
|---|---|---|
| 6,085,123 A | 7/2000 | Baca et al. |
| 6,295,578 B1 | 9/2001 | Dimitroff et al. |
| 6,336,172 B1 | 1/2002 | Day, III et al. |
| 6,421,711 B1 | 7/2002 | Blumenau et al. |
| 6,425,059 B1 | 7/2002 | Basham et al. |
| 6,507,896 B2 | 1/2003 | Sanada et al. |
| 6,519,678 B1 | 2/2003 | Basham et al. |
| 6,535,964 B2 | 3/2003 | Sanada et al. |
| 6,681,303 B1 * | 1/2004 | Watanabe et al. ........... 711/162 |

* cited by examiner

| INTERNAL (WHOLE LIBRARY) REPRESENTATION | EXTERNAL REPRESENTATION FOR PARTITION 215 LUN0 |
|---|---|
| ALL PARTITIONS | |
| Medium Transport Address=0 | Medium Transport Address=0 |
| Number of Medium Transports=1 | Number of Medium Transports=1 |
| PARTITION 215 LUN0 | |
| First Storage Element Address=31 | First Storage Element Address=31 |
| Number of Storage Elements=15 | Number of Storage Elements=15 |
| First Import Export Element Address=20 | First Import Export Element Address=20 |
| Number of Import Export Elements=5 | Number of Import Export Elements=5 |
| First Data Transfer Element Address=1 | First Data Transfer Element Address=1 |
| Number of Data Transfer Elements=2 | Number of Data Transfer Elements=2 |
| PARTITION 216 LUN1 | |
| First Storage Element Address=52 | |
| Number of Storage Elements=9 | |
| First Import Export Element Address=51 | |
| Number of Import Export Elements=1 | |
| First Data Transfer Element Address=3 | |
| Number of Data Transfer Elements=1 | |
| PARTITION 217 LUN2 | |
| First Storage Element Address=62 | |
| Number of Storage Elements=9 | |
| First Import Export Element Address=61 | |
| Number of Import Export Elements=1 | |
| First Data Transfer Element Address=4 | |
| Number of Data Transfer Elements=1 | |

*FIG. 3A*

| EXTERNAL REPRESENTATION FOR PARTITION 216 LUN1 | EXTERNAL REPRESENTATION FOR PARTITION 217 LUN2 |
|---|---|
| Medium Transport Address=0<br>Number of Medium Transports=1 | Medium Transport Address=0<br>Number of Medium Transports=1 |
| First Storage Element Address=31<br>Number of Storage Elements=9<br>First Import Export Element Address=20<br>Number of Import Export Elements=1<br>First Data Transfer Element Address=1<br>Number of Data Transfer Elements=1 | |
| | First Storage Element Address=31<br>Number of Storage Elements=9<br>First Import Export Element Address=20<br>Number of Import Export Elements=1<br>First Data Transfer Element Address=1<br>Number of Data Transfer Elements=1 |

*FIG. 3B*

SYSTEM AND METHOD FOR PARTITIONING A STORAGE AREA NETWORK ASSOCIATED DATA LIBRARY EMPLOYING ELEMENT ADDRESSES

RELATED APPLICATIONS

The present invention is related to the following copending and commonly assigned U.S. patent applications: Ser. No. 10/034,691 entitled System and Method for Partitioning a Storage Area Network Associated Data Library, filed Dec. 28, 2001 and which issued as U.S. Pat. No. 6,715,031, on Mar. 30, 2004; Ser. No. 10/032,662 entitled System and Method for Managing Access To Multiple Devices in a Partitioned Data Library, filed Dec. 28, 2001; Ser. No. 10/032,923 entitled System and Method for Peripheral Device Virtual Functionality Overlay, filed Dec. 28, 2001; Ser. No. 10/034,518 entitled System and Method for Securing Drive Access to Media Based On Medium Identification Numbers, filed Dec. 28, 2001; Ser. No. 10/034,888 entitled System and Method for Securing Drive Access to Data Storage Media Based On Medium Identifiers, filed Dec. 28, 2001; Ser. No. 10/033,010 entitled System and Method for Securing Fiber Channel Drive Access in a Partitioned Data Library, filed Dec. 28, 2001; Ser. No. 10/033,003 entitled Method for Using Partitioning to Provide Capacity on Demand in Data Libraries, filed Dec. 28, 2001; Ser. No. 10/034,580 entitled System and Method for Intermediating Communication with a Moveable Media Library Utilizing a Plurality of Partitions, filed Dec. 28, 2001; and Ser. No. 10/034,083 entitled System and Method for Managing a Moveable Media Library with Library Partitions, filed Dec. 28, 2001; the disclosures of which are hereby incorporated herein by reference.

TECHNICAL FIELD

The present invention is generally related to data storage and specifically to a system and method for partitioning a storage area network associated data library employing element addresses.

BACKGROUND

One of the most attractive aspects of a storage area network (SAN) is that network connectivity enables a company to efficiently use storage by sharing storage capacity among a number of servers. This may be implemented using a large number of small capacity storage devices. However, unless sufficiently robust management software is employed, such use of small capacity devices in a SAN may result in significant management overhead.

Most users prefer to install large capacity storage device(s) and partition one or more of the device(s), assigning each partition to a different server. For example, existing firmware for enterprise level disk arrays allow users to define multiple redundant array of independent disks (RAID) sets, where each RAID set appears as a different LUN, generally fiber channel (FC) LUNs. Each one of these FC LUNs may be dedicated to a different server. However, to-date special hardware or special backup software has previously been used to implement partitioning in data tape libraries.

An existing hardware-based partitioning scheme for existing data tape libraries is known as shared library services. This implementation requires at least one bridge, sometimes referred to as a quad interface processor, to be placed between the drives and the library controller. The host side of each quad interface processor consists of two SCSI buses, and the quad interface processor may show a single virtual library's controller, with its own SCSI ID, on each SCSI bus. Thus, there may be one virtual library per host SCSI bus, containing the virtual library controller and the drives in that partition. Each partition of such an existing library may have tape storage slots added in increments and drives may be added individually or in pairs. Each internal SCSI bus in this existing partitioning scheme may accommodate up to two drives; drives on the same bus must be in the same partition. Such existing data tape library partitioning systems may use switches to secure partitions. Quad interface processors expose a SCSI target ID for each partition and each SCSI ID can have a separate SCSI/FC bridge attached to it to implement partition security using FC switches.

Existing software-based partitioning solutions typically employ a host system that restricts access to portions of a tape library. The host restrictions are implemented by a mediating (software) process on a host system to enforce partition restrictions. However, this approach is problematic. Specifically, the approach is undesirable if the tape library is utilized in a storage service provider (SSP) environment. In SSP environments, the tape library and the host systems belong to different entities (e.g., the storage service provider and the customers). Placement of software mediating processes on host systems is unattractive, because it increases the burden on the customers to make use of the storage service. Also, corporate environments impose relatively long qualification cycles for new host system software. New software is typically only introduced in such environments once every six to eight months due to qualification cycles. Moreover, many customers are unwilling to allow other parties to place software on their host systems. Additionally, the software mediating process approach is typically incompatible with existing data back-up utilities, i.e., the software mediating process approach requires the use of specialized data back-up applications. Hence, users are effectively denied the ability to run desired backup software.

SUMMARY OF THE INVENTION

A data library adapted to be attached to a storage area network comprising a plurality of partitions, at least one data transfer element each of the data transfer elements assigned to one of the partitions and assigned an internally unique element address, a plurality of data storage element slots, each of the slots assigned to a partition and assigned an internally unique element address, at least one media transport element shared by the partitions to move media between the slots and the at least one data transfer elements, the transport assigned an internally unique element address, and a library controller that assigns a different logical unit designation to each of the partitions and that assigns external element addresses to the transport, the data transfer elements, and the slots for each of the partitions and maps the internally unique addresses to the external addresses, the controller restricting movement of media to and from the slots assigned to a same of the partitions.

BRIEF DESCRIPTION OF THE DRAWING

FIGS. 3A and 3B are each partial views comprising an exemplar representation of the contents of a SCSI element address assignment mode page of the partitioned library of FIG. 2.

DETAILED DESCRIPTION

The present invention is directed to a system and method to partition a data library to emulate existing data libraries. The present system and method preferably do not require any special hardware or special backup software for implementation. The present system and method enables a data library to be shared among a number of servers by partitioning the data library. Preferably, a subset or partition of the library drives and media slots are secured or reserved for the use of a specific server. Preferably a partition of the library, will identify itself and externally-present identical resources as an existing library model so that software can recognize the library type or model. For example, a six drive, sixty slot (6/60) data tape library could be partitioned to emulate three existing two drive, twenty slot (2/20) libraries with each partition/library assigned a logical unit designation such as a SCSI LUN. Additionally, movement of media in one partition may be queued to allow completion of transport operations within another partition.

The present invention preferably presents a subset of a population of tape drives and slots in a physical library by pruning the response to a read element status command, or the like, and emulating the identity of an existing library model. For example, a two drive, twenty slot partition may be externally identified as a Hewlett-Packard SureStore 2/20 data library. The library controller of a library partitioned according to the present system and method is preferably configured out-of-band via a remote management card interface employing the system and method disclosed in aforementioned U.S. Pat. application Ser. No. 10/034,691 entitled "System and Method for Partitioning a Storage Area Network Associated Data Library". The present system and method may identify which host originated a request to a library by using the SCSI LUN to which the request command is addressed, and hence which virtual library to present back in a read element status or other identity command.

Figure 1:
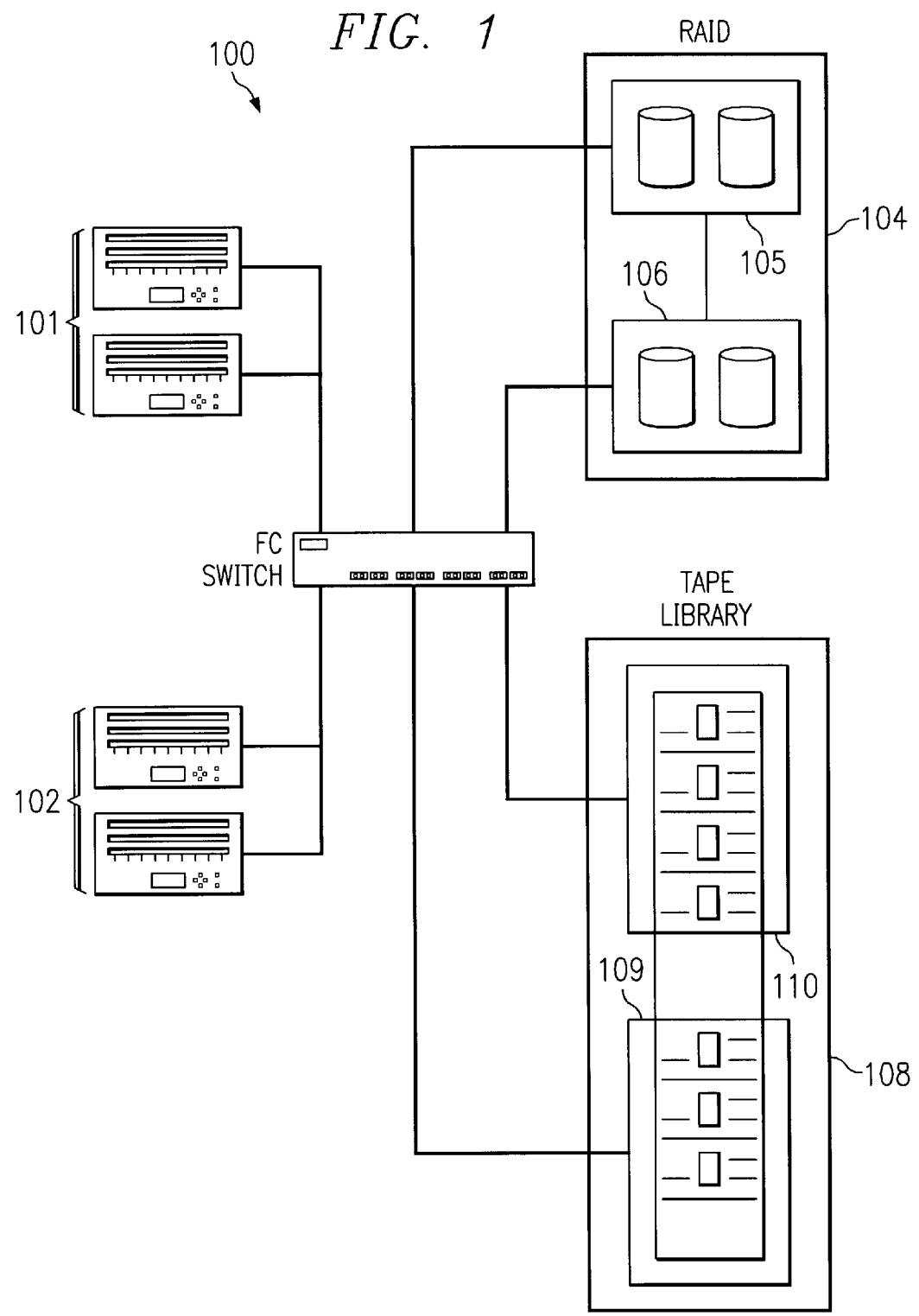
FIG. 1 is a diagrammatic illustration of a SAN operating consistent with the teachings of the present invention.

Turning to FIG. 1, SAN 100 is shown. By way of example, first and second customer servers 101 and 102 are connected to SAN 100 via FC switch 103. RAID 104 may be partitioned assigning first partition 105 to server 101 and second partition 106 to server 102 using FC-LUN based existing RAID partitioning methods. Preferably, tape library 108 is partitioned according to an embodiment of the present system and method to insure that data for server 101 is maintained in partition 109 separate from data for server 102, and that the data of server 102 is maintained in partition 110 separate from data for server 101. Such partitioning ensures that the servers may not access each other's data even though both servers' data is maintained in the same physical library.

Figure 2:
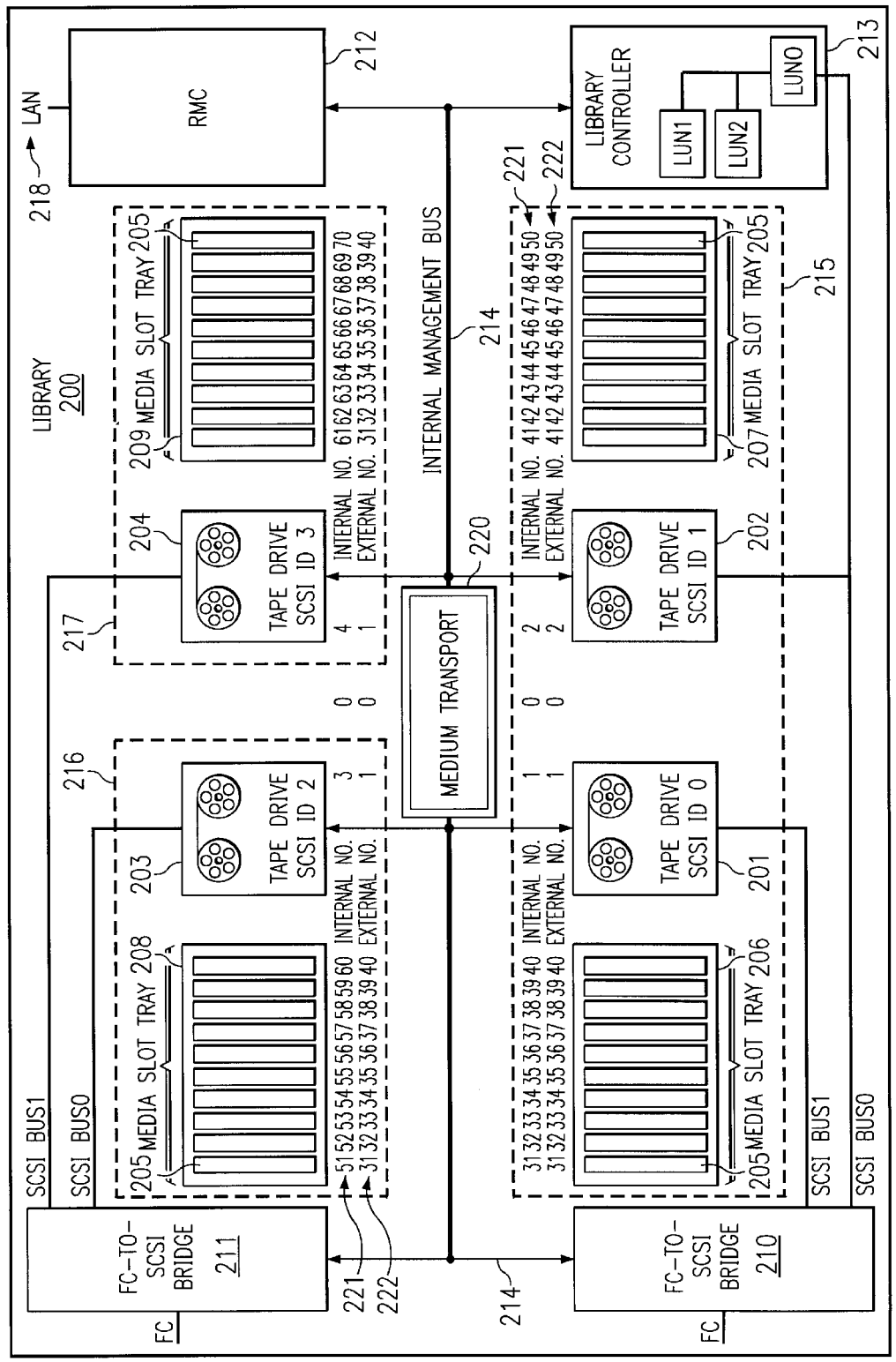
FIG. 2 is a diagrammatic illustration of an example of a data library employing an embodiment of data library partitioning and emulation according to the present invention.

Data tape library 200 employing a preferred embodiment of the present system and method is illustrated in FIG. 2 as an example of a library that may be employed as library 108 of FIG. 1. However, other library designs and/or capacities may embody the present system and method. Example library 200 has four tape drives 201–204; forty media slots 205, that may be organized into four trays 206–209 of ten slots each; two FC-to-SCSI bridges 210 and 211; a library management interface card, or remote management card (RMC) 212 ;and library controller 213. Tape drives 201–204, FC-to-SCSI bridges 210 and 211, RMC 212 and library controller 213 preferably communicate with each other using an internal management bus 214 of any type, such as Peripheral Component Interconnect (PCI), Inter-integrated circuit (I²C), Universal Serial Bus (USB), or the like. For partitions according to the present system and method library media slots 205 and tape drives 201–204 should be assigned to each partition, and a virtual library controller should be addressable in each partition. The example partitioning shown in FIG. 2 is indicated by boxes 215, 216 and 217. Finally, import/export elements or mailslots may be assigned to each partition or configured for use by the entire library. Easily accessible media storage slots may be configured as mailslots by the present invention.

In the present library partitioning implementation, library partitioning is preferably configured out-of-band either on the library's front panel management interface or via secure RMC 212 over attached LAN 218 or the like. This helps ensure controlled access security of the partitioning process by, for example, limiting access to users with access to LAN 218 or physical access to the front panel of library 200. Alternatively, the present partitioning system and method may be configured over a secured in-band connection. Over out-of-band LAN 218, configuration may either be carried out via a web browser interface or via a network management protocol interface. By default, data library 200 will preferably contain one unsecured partition preferably labeled as partition 0 that contains a standard configuration of library data transfer elements (drives) 201–204, library storage elements (slots) 205 including import/export elements (mailslots).

For library emulation to appear authentic to accessing servers, media changer or robotic media transport 220 of library 200 may be shared among the accessing servers, but it should appear to each server that it is in sole control of transport 220. Import/export elements, or mailslots, may also be a shared resource that should be assigned to a partition, virtualized or replicated. For example, mailsiots may be assigned to a partition for exclusive use of that partition. Preferably, a physical library initially has one unsecured partition with the default number of mailslots for that physical library. In order to alter the partitioning from the default state, the default partition is preferably deleted, disabling all elements. The user can then create a partition containing the specified number of storage elements and data transfer elements. Some partition storage elements may be designated as mailslots by default. In order to add or remove mailslots for a partition, a mailslot configuration request from the RMC 212 or the front panel to library controller 213 is employed. Alternatively, mailslots may be shared across partitions. In this case, requests to move media from a data transfer element or storage element in a partition to a shared mailslot are preferably deferred until a request is made, preferably via RMC 212 or the library front panel, to carry out the requested move. The single medium is then physically removed from the mailslot by an operator, the deferred medium for the next partition is then requested to be moved to the mailslot and physically removed. This repeats until all deferred moves have been completed.

Internal element numbers 221 are used by controller 213 to designate different elements of library 200. For example, transport 220 may be assigned element number 0; drives 201 through 204 may be internally represented as elements 1 through 4, respectively; and, storage elements 205 may be internally assigned element numbers 31 through 70. Mailslots may be separately designated from storage elements and are preferably assigned element numbers from 20–29. As discussed in greater detail below, in the present system and method, these elements may be externally presented by employing external element numbers 222, with each partition preferably comprising elements numbered from zero, similar to an existing library emulated by the partition. Therefore, with transport 220 shared by the partitions with element number 0, partition 215 would externally present elements 0 through 2 and 31 through 50 while partitions 216 and 217 would each externally present elements 0, 1 and 31 through 40.

Controller 213 preferably partitions the slots as requested by a user via RMC 212. These requests will list the partition number that preferably equates to the LUN the partition employs, the address of the first slot and number of slots, the address of the first data transfer element and number of data transfer elements in the partition. A partition request is based on the element numbers of the actual physical library. For example, a request to configure partition 215 of FIG. 2 on LUN 0 might contain the following entries: Partition Number=0; First Slot=31; Number of Slots=20; First Data Transfer Element Address=1; and Number of Data Transfer Elements=2. Conversely, a request to configure partition 216 on LUN 1 might contain the following entries: Partition Number=1; First Slot=51; Number of Slots=10; First Data Transfer Element Address=3; and Number of Data Transfer Elements=1. Correspondingly, a request to configure partition 217 on LUN 2 might contain the following entries: Partition Number=2; First Slot=61; Number of Slots=10; First Data Transfer Element Address=4; and Number of Data Transfer Elements =1. To delete partitions, a request is sent with the partition number. As a result, the configuration for the identified partition is wiped from the controller and the controller no longer responds on that LUN.

The system and method of data library partitioning employed by the present invention has advantages over existing data tape library partitioning implementations. For example, the present system and method avoids the need for quad interface processors or the like. In the present system and method, all drives in a partition do not necessarily have to be on the same SCSI bus, thereby avoiding potential bottlenecks. The present system and method employs existing data tape library physical architecture with drives preferably using their original existing SCSI bus.

To establish multiple virtual controllers, each assigned to a separate partition, the controller preferably assigns a different SCSI LUN, under its SCSI ID, to each virtual controller. In the present system and method, the library controller preferably presents multiple instances of itself, one for each active partition. Although only one controller is needed on the SCSI bus, the controller firmware should be able to process commands active on each individual LUN, such as properly supporting disconnects. Additionally, the controller firmware should correctly maintain the status for each LUN correctly, providing the proper response to test unit ready, request sense, mode page requests, log page requests and similar status inquiries. Partitioning should be persistent between power-cycles and not require a power cycle to alter partitioning configuration. By default, the library will preferably contain one partition, preferably assigned LUN 0.

Partitions can be secured in a FC SAN environment by enabling access by only specified hosts, keyed on host world wide names (WWN), without requiring external switches to implement switch zoning to secure partitions. Integrated configuration by the present system and method of all major components involved in secure partitioning, bridges, library controller and drives, by a library management card preferably allows point-and-click setup of security. This greatly reduces management overhead and margin for error as compared to existing FC switch zoning security implementation for bridges, where each component has to be separately set up.

Library 200 may be configured in a flexibility-oriented partitioning scheme, wherein the library controller inquiry string for each active partition type will be unique and based on the number of slots and drives in the partition. For example, an inquiry string for partition 215 would uniquely identify the partition, including an indication of two drives and twenty slots, while an inquiry string for partition 216 or partition 217 would include indications of one drive and ten slots each. Alternatively, library 200 may be configured in a compatibility-oriented partitioning scheme, wherein the library controller inquiry string for each active partition type will be the standard inquiry string associated with an existing library manufacturer model. For example, partition 215 could be identified as a Hewlett Packard SureStore 2/20 model library and partitions 216 and 217 could each be identified as Hewlett Packard SureStore 1/9 model libraries.

Preferably a command addressed to one partition will not interfere with commands and configurations of partitions on other LUNs. The library controller preferably supports multiple LUNs consistent with the SCSI specification. To that end the library controller preferably supports commands interleaved to different LUNs. For example, when a command to LUN 0 is received, the controller should disconnect while processing the command. Therefore, if a command is received for LUN 1 while the command to LUN 0 is being carried out, the command for LUN 1 may be processed. Status inquiries such as unit attention, response to request sense and test unit ready, should be handled on a per LUN basis. The inquiry data for each LUN should be consistent with the library type the partition is emulating. Cross-partition information supported in SCSI log and mode pages, such as log select, log sense, mode select and mode sense may be supported on a per-LUN basis. Additionally, any functionality in change definition, read buffer, receive diagnostic results, rezero unit, send diagnostic and write buffer commands may also be supported on a per-LUN basis. A SCSI device capabilities mode page should reflect the valid operations available in a partition associated with a LUN. Particularly, import/export elements should be reported on a per-partition basis. In some existing libraries, one or more of the storage elements of a partition ma y be designate d as import/ export element(s) for the partition.

FIG. 3 is a table illustrating information indicative of exemplar SCSI element address assignment mode page 300. Internal element addresses are preferably represented as normal for the entire actual library as shown in FIG. 2 and column 310 of FIG. 3. However, when decoding commands and reporting information, the element addresses in that partition should be renumbered to conform to the numbering of elements in the emulated library. For the example illustrated in FIG. 2, the transport 220 will generally be numbered zero, the data transfer elements will generally be numbered from 1 and the slots will generally be numbered from 31. The numbering shown in FIG. 2 is detailed in columns 311, 312 and 313 of FIG. 3, for partitions 215, 216 and 217, respectively.

As illustrated in FIG. 3, SCSI element address assignment mode page 300 should reflect the number of transports in a partition associated with a LUN by medium transport element address 301 and number of medium transport elements 302. In the illustrated example, the partitions are sharing one transport with the element number 0, corresponding to transport 220 of FIG. 2. Accordingly, if there is one transport robot in a library, a transport geometry parameters mode page should report the capabilities of the shared robot in the library. This report should be the same for all partitions. SCSI element address assignment mode page 300 should reflect the number of slots in a partition associated with a LUN by first storage element address 303 and number of storage elements 304. The mailslots should be reflected by the first import/export element address 305 and number of import/export elements 306. The number of drives should be reflected by the first data transfer element address 307 and number of data transfer elements 308. Externally-presented numbering for elements in a partition should start from 0 for that partition and preferably be the same as in the emulated library, as described below.

With attention directed to columns 310 and 311 of FIG. 3, the first partition, partition 215, assigned LUN 0, has storage elements internally and externally represented by first storage element address 31 and the number of storage elements indicated as 15. Five slots are indicated as being designated as import/export (mail) slots for partition 215. The first of these is represented internally and externally as element number 20. These storage and mail slots make up trays 206 and 207 of FIG. 2. The first of the two drives, as presented internally and externally, for partition 215 is element number 1. This corresponds to FIG. 2 drive 201 being the first drive in partition 215 and drive 202 as also being part of partition 215.

Turning to columns 310 and 312 of FIG. 3, partition 216, assigned LUN 1, has storage elements internally represented by first storage element address 52 and the number of storage elements indicated as 9. Externally, the first storage element is represented as having element address 31 of an emulated library. One slot is indicated as being designated as an import/export (mail) slot for partition 216. This mail slot is internally represented as slot 51 and externally as slot 20. These storage and mail slots make up physical library tray 208 of FIG. 2. Partition 216 has one drive that is internally presented at element address 3. Externally this drive is presented as having element address 1. This drive corresponds to drive 203 of FIG. 2.

Similarly, as indicated in columns 310 and 313 of FIG. 3, partition 217, having LUN 2, has storage elements internally represented by first storage element address 62 and the number of storage elements indicated as 9. Externally, the first storage element is represented as having element address 31 of an emulated library. One slot is indicated as being designated as an import/export (mail) slot for partition 217. This mail slot is internally represented as slot 61 and externally as slot 20 of this emulated library. These storage and mail slots make up physical library tray 209 of FIG. 2. Partition 217 has one drive that is internally presented at element address 4. Externally this drive is presented as having element address 1. This drive corresponds to drive 204 of FIG. 2.

Some SCSI commands to a data library are preferably altered to implement the present invention. For example, a library medium changer preferably supports the following SCSI commands. An inquiry command should identify the vendor of an emulated library, product identification of the emulated library, product revision level of the emulated library and the specific vendor of the emulated library. A move medium command should employ the transport element address of the actual physical library. Source addresses and destination addresses should be renumbered and bounds checked as indicated above and illustrated in FIGS. 2 and 3. Request sense and test unit ready commands should be carried out as would normally be done for the actual physical library.

A prevent/allow medium removal command should only lock media in the slots associated with the partition. Medium changer-specific commands, such as exchange medium, initialize element status, move medium, position to element, read element status, release, request volume element address, reserve, and send volume tag, preferably present elements and volume tag information in the partition associated with the LUN of the emulated library to which the request is addressed.

If one or more of the tape drives in a library are SCSI tape drives and the library is connected to a SAN or the like employing FC-to-SCSI bridges, the library controller should preferably be connected to one of the FC-to-SCSI bridges and the library controller LUNs, one for each partition, should appear behind that bridge. The controller will preferably appear as a single LUN externally and the bridge will map requests from each host to a unique internal LUN so the controller is able to identify the originating SCSI host from the LUN it is addressing.

If one or more of the tape drives in the library is a FC drive, the library controller may appear as a FC LUN behind the tape drive. An originating host of SCSI requests may be identified via a FC tape drive surrogate LUN, or the like. The controller preferably receives partition configuration information from the RMC for any FC tape drives attached to the controller. The controller preferably passes the configuration to the tape drive via an automated control interface (ACI) extending between said controller and said FC tape drive. When a library controller is communicated with via such a FC drive surrogate LUN, the library will use information as to which tape drive it received the command from over the ACI to determine which virtual library is being addressed. When the controller receives a SCSI request over the ACI, it should determine which tape drive the request is from, and map this to the entire actual library data transfer element address for that tape drive. The controller will then use this information to determine which partition the SCSI command was addressed to and accordingly process the command.

If the library controller is configured as a surrogate to a FC tape drive, and the FC tape drive is replaced, the controller will check whether the tape drive supports partitioning via the ACI. If the tape drive does support partitioning, then the controller will inform the management card to resend configuration information for the tape drive. If the FC tape drive firmware does not support partitioning, the controller will place the FC drive offline and inform the management card that the FC tape drive does not support partitioning.

As will be appreciated by one skilled in the art, the present system and method may be extended to allow library partitions to respond to both a host and data-mover functionality, allowing zero downtime backup (ZDB) to particular partitions of the library.

What is claimed is:

1. A data library adapted to be attached to a storage area network, said library comprising:

a plurality of partitions;

at least one data transfer element assigned to one of said partitions and assigned an internally unique element address;

a plurality of data storage element slots, each of said slots assigned to a partition and assigned an internally unique element address;

at least one media transport element shared by said partitions to move media between said slots and said at least one data transfer elements, said transport assigned an internally unique element address; and a library controller that assigns a different logical unit designation to each of said partitions and that assigns external element addresses to said at least one transport element, said at least one data transfer element, and said slots for each of said partitions and maps said internally unique addresses to said external addresses, said controller restricting movement of media to and from said slots assigned to a same of said partitions.

2. The library of claim 1 wherein said library controller restricts movement of said media to and from said at least one data transfer elements, said slots assigned to a same partition and said at least one data transfer elements assigned to a same of said partitions.

3. The library of claim 1 wherein each of said partitions comprise at least one of said data transfer elements and at least one of said slots corresponding to as an existing data library model of a plurality of existing library models.

4. The library of claim 3 wherein said controller identifies each of said partitions to a user as said corresponding existing data library model.

5. The library of claim 3 wherein said controller responds to an inquiry command by providing at least one response of a group of responses consisting of: a vendor of said corresponding existing data library model, a product identification for said corresponding existing data library model, and a product revision level of said corresponding existing data library model.

6. The system of claim 1 wherein at least one of said slots in at least one of said partitions is defined as an import/export slot.

7. The library of claim 1 wherein said controller employs said internally unique element address of said transport in response to a move medium command to carry out said command.

8. The library of claim 1 wherein said external element addresses for each partition begin with a same element number.

9. The library of claim 1 wherein said controller identifies a user of said storage area network by which logical unit designation said user addresses.

10. A method for partitioning a data library adapted to be attached to a storage area network, said method comprising:
assigning a different logical unit designation to each of a plurality of library partitions;
numbering at least one media transport, a plurality of data transfer elements and a plurality of storage element slots with a set of unique internal element numbers, each said slots adapted to store media, each of said data transfer elements adapted to receive said media and transfer data to and from said media and said at least one transport adapted to move said media between said slots and said data transfer elements;
establishing said partitions in said data library, each of said partitions comprising at least one of said slots, at least one of said data transfer elements and at least one of said at least one transports;
renumbering said transport, slots and data transfer elements in each of said partitions with externally presented element numbers starting from a same externally presented element number for each partition;
mapping said externally presented element numbers for each of said partitions to said internal element numbers; and
controlling movement of said media to and from said slots assigned to a same partition.

11. The method of claim 10 wherein said controlling comprises controlling movement of said media to and from said data transfer elements assigned to a same partition, wherein said slots assigned to a same partition and said data transfer elements assigned to a same partition are assigned to a same partition.

12. The method of claim 10 further comprising:
employing said internal element address of said transport in response to a move medium command.

13. The method of claim 10 further comprising:
defining at least one of said slots as an import/export slot.

14. The method of claim 10 further comprising:
identifying a user of said storage area network by which logical unit designation said user addresses.

15. The method of claim 10 wherein said establishing includes establishing each of said partitions with a number of said slots and a number of said data transfer elements corresponding to an existing data library model.

16. The method of claim 15 further comprising:
identifying each of said partitions to a user as said corresponding existing data library model.

17. The method of claim 10 further comprising:
responding to an inquiry command by providing at least one response of a group of responses consisting of: a vendor of an existing data library model, a product identification for an existing data library model, and a product revision level of an existing data library model.

18. A partitioned storage area network with an attached data library, said network comprising:
a data storage array that is divided into a plurality of partitions; and
a library management interface that accepts user input partitioning said library and assigns a logical unit number to library partitions, said library comprising:
a plurality of data transfer elements, each of said data transfer elements assigned to one of said partitions and assigned an internally unique element address;
a plurality of data storage element slots, each of said slots assigned to one of said partitions and assigned an internally unique element address;
at least one media transport element, said at least one media transport element shared by said partitions to move media between said slots and said data transfer elements, said transport assigned an internally unique element address; and
a library controller that assigns external element addresses to said transport, data transfer elements, and slots for each of said partitions and maps said internal addresses to said external addresses for each of said partitions, said controller restricting movement of media between said slots, data transfer elements assigned to a same one of said partitions.

19. The network of claim 18 wherein each of said partitions comprise a number of said data transfer elements and a number of said slots corresponding to as an existing data library model of a plurality of existing library models.

20. The network of claim 19 wherein said controller identifies each of said partitions to a user as said corresponding existing data library model.

21. The network of claim 18 wherein said controller responds to an inquiry command by providing at least one response of a group of responses consisting of: a vendor of an existing data library model, a product identification for an existing data library model, and a product revision level of an existing data library model.

22. The network of claim 18 wherein said external element addresses for each partition begins with a same element address.

23. The network of claim 18 wherein at least one of said slots in at least one of said partitions is defined as an import/export slot.

24. The network of claim 18 wherein said controller identifies a network user by which logical unit number it addresses.

* * * * *